United States Patent [19]
Witherspoon et al.

[11] 3,779,812
[45] Dec. 18, 1973

[54] HYDROPHILIC TREATMENT FOR HYDROPHOBIC GAS ELECTRODES

[75] Inventors: Romeo R. Witherspoon, Utica, Mich.

[73] Assignee: General Motors Corporation, Detroit, Mich.

[22] Filed: Nov. 2, 1970

[21] Appl. No.: 86,058

[52] U.S. Cl. .................................. 136/120 FC
[51] Int. Cl. .................................... H01m 13/08
[58] Field of Search ............... 136/120 FC, 86 D

[56] References Cited
UNITED STATES PATENTS

| | | | |
|---|---|---|---|
| 2,615,932 | 10/1952 | Marko et al. | 136/120 FC |
| 3,297,484 | 1/1967 | Niedrach | 136/120 FC |
| 3,386,859 | 6/1968 | Biddick | 136/120 FC |
| 3,419,437 | 12/1968 | Jung et al. | 136/120 FC |
| 3,409,474 | 11/1968 | Jung et al. | 136/120 FC |

*Primary Examiner*—Winston A. Douglas
*Assistant Examiner*—M. J. Andrews
*Attorney*—William S. Pettigrew; R. J. Wallace; Lawrence B. Plant

[57] ABSTRACT

Coating and infiltrating hydrophobic-type, gas electrodes with an alcohol-soluble, alkaline earth metal carboxylate and subsequently converting the carboxylate to its corresponding oxide or hydroxide for subsequent use in alkaline electrolyte gas depolarized cells. The alkaline earth metal oxide/hydroxide impregnated electrode has a plurality of electrolyte wettable paths extending into the otherwise hydrophobic structure which effectively extends the reactive surface area of the electrode without substantially reducing its hydrophobic properties.

8 Claims, 1 Drawing Figure

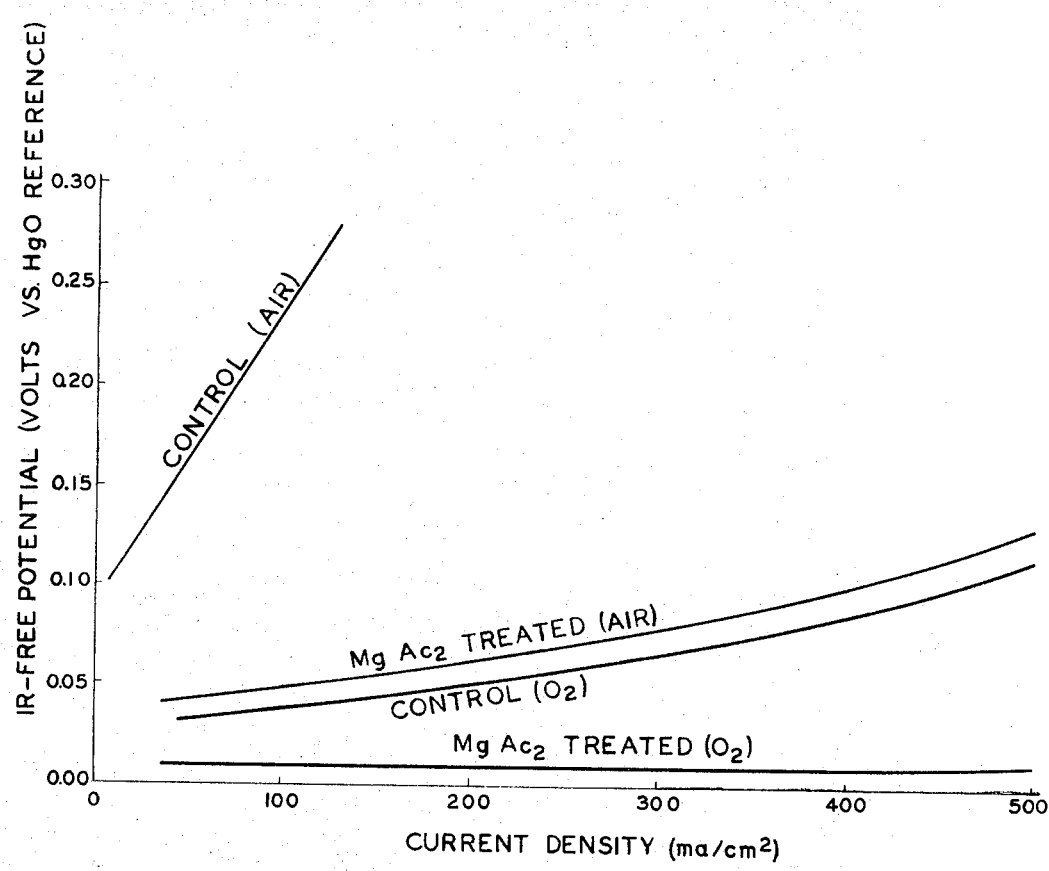

HYDROPHILIC TREATMENT FOR HYDROPHOBIC GAS ELECTRODES

This invention relates generally to gas electrodes for fuel cells and fuel batteries. More specifically, this invention relates to gas electrodes of the controlled-wetting or hydrophobic-type in which hydrophobic wet-proofants such as plastics (e.g., polyethylene, polypropylene, polystyrene, polyvinyl chloride and/or Teflon) and the naturally occurring waxes are variously dispersed throughout electrocatalytic materials (e.g., noble metal blacks, catalyzed carbon and acetylene blacks, catalyzed activated carbon, metal carbides and borides, lithiated nickel oxide, etc.). In electrodes of this type, the wetproofing agent is incorporated into the electrode either during fabrication of the electrode structure, as by mixing with the electrocatalysts, or by impregnation (e.g., with wax) of an already formed electrode structure. The purpose of the wet-proofing is basically to provide an electrode having its maximum wetting angle (e.g., at least about 100°) on the electrode's gas side.

Though effective with all types of hydrophobic electrodes, the improvement of this invention is most particuarly applicable to electrodes in which the wetproofing agent is incorporated at the time the electrode structure is formed. This usually involves admixing hydrophobic particles and electrocatalytic particles and sintering the mixture. In such an admixture, the hydrophobic particles may vary from as little as about 5 percent by weight to as much as about 75 percent by weight. In one version of this type of hydrophobic electrode, a conductive support and current collector (e.g., nickel screen or the like) is impregnated with polytetrafluoroethylene-bonded electrocatalytic particles (e.g., platinum black). A thin film of hydrophobic agent is formed on the gas side of the impregnated collector. Electrodes of this type can be prepared by providing a layer of a first admixture of hydrophobic polytetrafluoroethylene particles (e.g., 0.01 – 0.90 microns) and electrocatalyst (e.g., platinum black) particles (e.g., 10 – 100 m$^2$/g) on a first thin aluminum foil. A thin film of all polytetrafluoroethylene particles is formed on a second foil. Next, a layer comprising an admixture of polytetrafluoroethylene and electrocatalyst particles, similar to the first admixture, is provided atop the all-polytetrafluoroethylene film. A conductive screen (e.g., Pt, Ag, Ni, Au, etc.) is placed between the admixture layers and the entire assembly hot-pressed (350° C.) at 500 to 4,000 lbs/in$^2$. The aluminum foils are then removed, as by dissolving in sodium hydroxide. The electrodes thusly formed are porous (i.e., 40 – 60 percent) and vary in thicknesses from about 0.012 cm to about 0.050 cm., with the polytetrafluoroethylene film accounting for about 0.005 to 0.025 cm of the overall thickness.

In another version of a controlled wetting or hydrophobic-type electrode, a porous metal sheet (e.g., nickel) is sprayed, or otherwise coated, with a hydrophobic polymer, such as polytetrafluoroethylene, and dried at about 100° C. The sheet is next coated with an admixture of particles containing about 50 percent polytetrafluoroethylene and 50 percent unactive carbon, dried at about 100° C. and then sintered for about 3 hours at 400° C. in an inert nitrogen atmosphere. It is next sprayed with polyethylene dissolved in toluene and dried. The polyethylene is less hydrophobic than the polytetrafluoroethylene. A number of additional layers comprising various admixtures of polyethylene and active carbon (i.e., 5–20 microns), with progressively decreasing polyethylene content, are sprayed onto the polyethylene film. In one specific case, for example, the first polyethylene-active carbon layer contains about 20 percent polyethylene, a second layer about 10 percent polyethylene and a last layer about 5 percent polyethylene. By active carbon is meant one which has been catalyzed, as by coating with an electrocatalyst or the like. The electrode is next hot-pressed (i.e., 130° – 140° C.) at about 1,000 lbs/in$^2$ to sinter the several layers. The several polyethylene-carbon layers comprise about 0.01 – 0.05 cm of the total thickness which can vary from about 0.02 cm to about 0.10 cm. The surface containing the least hydrophobic material (i.e., 5 percent polyethylene) contacts the electrolyte while the polytetrafluoroethylene surface contacts the gas (e.g., oxygen). The active carbon in the layers adjacent the electrolyte may be made catalytic either before or after it is formed into the electrode. This is conveniently accomplished by thermally decomposing an appropriate metal salt which has been applied to the carbon particle from a solution of that salt. Other techniques known to those skilled in the art can also be used for catalytically activating the carbon particles. Electrocatalyst loadings will normally generally vary from about 0.50 – 10 milligrams per square centimeter of electrode.

Controlled wetting or hydrophobic type cathodes for air or oxygen have heretofore generally required a substantial "break-in" period during which time cathode polarization decreases and the overall cell voltage increases to a stabilized level. That is to say, cathode polarization is initially undesirably high. After continued use, which frequently extends several days, it slowly declines to a more acceptable, substantially stable value. Higher concentrations of hydrophobic agent leads to longer "break-in" periods. The alkaline earth metal oxide/hydroxide impregnation treatment of this invention significantly reduces the duration of the cathode "break-in" period.

Conversely, controlled wetting or hydrophobic-type anodes for hydrogen slowly increase in polarization with time, apparently due to catalyst poisoning. Eventually polarization increases to such a level that the electrode must be discarded. The treatment of this invention increases the useful life of hydrophobic-type anodes.

Accordingly, it is an object of this invention to reduce the "break-in" period for hydrophobic-type cathodes and increase the useful life of hydrophobic-type anodes. It is a further object of this invention to increase the peak current densities available from hydrophobic-type anodes and cathodes without increasing catalyst loadings. A still further object of this invention is to produce hydrophobic-type electrodes having reduced catalyst loadings but comparable performance to presently known hydrophobic-type electrodes. These and other objects of this invention will become more apparent from the detailed description which follows.

More specifically, a preferred form of this invention comprehends providing a hydrophobic-type electrode having alkaline earth metal oxides or hydroxides distributed throughout its interstices and further comprehends manufacturing same by brushing, spraying, dipping or otherwise coating and impregnating or infiltrating hydrophobic-type electrodes with alcohol solutions of alkaline earth metal carboxylates and thereafter, in situ, converting the carboxylates to a corresponding alkaline earth metal oxide or hydroxide to provide an electrolyte wettable surface and a plurality of electrolyte wettable wick-like paths extending into the electrode. The effective reactive surface area of the electrode is thereby increased without substantially compromising the wet-proofing necessary to avoid bubbling and/or weeping of the electrode while in use. As herein used, the term "alkaline earth metal" is intended to include the Group IIA elements, magnesium, calcium, strontium and barium, with magnesium and calcium being the preferred materials. The carboxylates usable with the process of this invention include the non-soap derivatives of the lower fatty acids (i.e., formates – caprylates), and derivatives of the di — and hydroxy — acids which are soluble in alcohol or alcohol — $H_2O$ mixtures. An alcohol-water solvent containing about 100–300 grams per liter of magnesium or calcium acetate solute is most preferred.

Electrodes made in accordance with this invention have an alkaline-electrolyte-insoluble alkaline earth metal oxide or hydroxide distributed throughout the interstices of the electrode. The oxides or hydroxides form about 10 percent to about 50 percent by weight of the electrode's active layer and apparently act like wicks extending into the active layer of the electrode. In a preferred form, a coating of the oxide/hydroxide is also formed on the electrolyte side of the electrode. Below about 10 percent, there is insufficient oxide or hydroxide present in the electrode to provide appreciable penetration of the electrode by the electrolyte. Above about 50 percent no appreciably new benefits are obtained over those already attainable at 50 percent. In fact, above about 50 percent the oxides/hydroxides tend to block the porous electrode, restricting electrolyte diffusion into its interstices thereby giving rise to concentration polarization problems. The oxide/hydroxide pulls the electrolyte into the active layer of the electrolyte by surface tension without causing electrode weeping. The effective internal reactive surface area of the electrode is thereby increased without compromising the hydrophobic character of the electrode. This invention is particularly useful with thin layer oxygen or air cathodes in which the active layer comprises an electrocatalyst loading of at least about 1 $mg/cm^2$ to about 40 $mg/cm^2$ on an appropriate substrate. For such electrodes, the alkaline earth metal oxide or hydroxide loading then can vary from about 0.2 $mg/cm^2$ to about 20 $mg/cm^2$ depending on the electrocatalyst loading. I prefer electrodes comprising about 10 $mg/cm^2$ of electrocatalyst and about 5 $mg/cm^2$ of oxide/hydroxide in the active layer. Higher catalyst loadings will produce higher currents but the increased current obtained is disproportionate to the cost involved.

In a preferred form of the invention, the alkaline earth metal oxide/hydroxide is formed, in situ, on one face of, and in the interstices of, the electrode. To this end, a solution of an alkaline earth metal carboxylate is introduced into the electrode. About 100–300 grams of the carboxylate is dissolved in a liter of mixed solvent comprising at least about 10 percent and preferably about 50 percent or more alcohol (e.g., methyl, ethyl, propyl, etc.). A 100 percent alcohol solvent could be used, but other solvents, such as water in concentrations of at least about 10 percent when mixed with the alcohol increase the solubility of the carboxylates in the solvent. At least about 100 g/l of carboxylate is desirable to get an effective amount of carboxylate into the electrode without numerous multiple applications. On the other hand, solutions containing more than about 300 g/l are so viscous and paste-like that deep penetration of the electrode is not practically possible. In a preferred form, the carboxylate solution is introduced into the electrode from the electrolyte side thereof. After drying, a thin layer (i.e., 0.002 cm) or coating of the carboxylate remains on the electrolyte face of the electrode. While I prefer to brush the electrodes with the carboxylate, dipping, spraying, vacuum impregnation or other techniques known to those skilled in the art may be used to get the carboxylate into and, where desired, onto the electrolyte-exposed face of the electrode. Successful electrodes have been made by mixing the carboxylates with the electrolytic materials and the wetproofing. Drying follows and may be accomplished by heating the electrode sufficiently to drive off the solvent, e.g., about 100° C. for 15 min. In some cases, the electrolyte face will not have a specific coating of oxide/hydroxide. For those applications, the carboxylate is conveniently added to the electrocatalyst-polymer admixture prior to forming the electrode.

After drying, the carboxylate, which is distributed throughout the electrode, is converted to the corresponding oxide or hydroxide. In one embodiment, conversion is accomplished by heating the electrode to a temperature above the thermal decomposition temperature of the particular carboxylate. The corresponding alkaline earth metal oxide is left as a residue. In this embodiment, only the carboxylates have shown to be effective for producing the desired oxides or hydroxides. In another embodiment, the dried carboxylated electrode is put directly into a cell having a caustic electrolyte (e.g., KOH). A chemical reaction with the potassium hydroxide electrolyte produces the corresponding alkaline earth metal hydroxide in the pores of the electrode. In this embodiment a number of inorganic alkaline earth metal salts, such as the chlorides or sulfates, may be used so long as the anions would not detrimentally affect the anode. These other salts may be used here since they will react to form the desired oxide/hydroxide.

Regardless of how the alkaline earth metal oxide/hydroxide is formed in the electrode, its presence therein materially shortens the "break in" period for cathodes, increases the effective life of anodes and increases the peak current density available from each electrode. The alkaline earth metal oxide/hydroxide makes the electrode more hydrophilic by providing highly electrolyte wettable wick-like paths extending from the electrolyte face into the electrode body. While this makes a great many more catalyst sites accessible to the electrolyte it does not induce electrode weeping since the electrolyte which has penetrated deep into the electrode is held therein by the same surface tension on the oxide/hydroxide which promoted its penetration. Electrodes offering increased electrolyte contact with the catalyst are particularly important in the case of gas anodes since increased catalyst exposure extends anode life by increasing the time required to poison the catalyst. On the other hand, in an ideal, catalyst-poison-free system, reduced catalyst loadings are possible without sacrificing cell performance.

In one specific example of my invention, 7 cm × 8 cm electrode sheets were prepared by mixing 10 grams of a carbon black known commercially as Raven 30 (110 $m^2/g$ surface area) with 10 grams of polytetrafluoroethylene particles. The carbon black was first heated for 4 hours at 1,200° C. The polytetrafluoroethylene, available as Teflon 41BX, was suspended (34 percent solids) in 180 mls of isopropanol using 20 mls of $NH_4OH$ as a dispersing media. 25 mls of the suspension was used with the carbon black and was mixed in a blender for 5 min. The carbon-Teflon suspension was sprayed on a porous conductive support material, dried and pressed at 70 $kg/cm^2$ resulting in a carbon-Teflon layer of 8 $mg/cm^2$. The carbon-Teflon cake was catalyzed in a conventional manner using 2.5 milliliters of a $Ag_2Pd$ solution comprising 20 mgs of $Ag_2Pd$ in 1 ml of isopropanol, dried at 175° C. for 5 minutes, and finally baked at 288° C. for 10 min. This treatment added 1 $mg/cm^2$ of catalyst to the carbon-Teflon layer. Test electrodes (4 $cm^2$) were cut from the 7 cm × 8 cm electrode sheet. Some of the test electrodes were used as controls and were untreated. Others were treated in accordance with this invention. The electrolyte face of the treated electrodes were brushed with a solution comprising 300 grams of hydrated magnesium acetate dissolved in a liter of a 1:1 isopropyl alcohol-water mixture. Brushing continued until no more solution was absorbed and a film of solution remained on the face of the electrode. The electrodes were next dried for five minutes at 150° C. followed by a final bake at 320° C. for five minutes which left a residue of about 4.5 $mgs/cm^2$ of magnesium oxide on the electrode. The electrodes were evaluated at 85° C. in a test cell having a 45 percent KOH electrolyte. Potential readings for each electrode were made against a mercuric oxide reference electrode using a Kordesch-Marko interrupter to eliminate IR losses from the potential measurements. A stream of air was blown across the surface of the cathode so as to give the minimum polarization at the highest current density studied (500 $ma/cm^2$). The several electrodes were each polarized to 500 milliamperes per square centimeter ($ma/cm^2$) and the time noted for each electrode to reach a stable value. At 500 $ma/cm^2$, electrodes treated in accordance with this invention stabilized in 5 minutes, whereas the untreated electrodes stabilized in 2 hours. When the minimum polarization was reached, a complete polarization curve was run from 0 to 500 $ma/cm^2$. Both air and oxygen were used as the depolarizing gases. The Figure dramatically shows the comparison between the polarization curves of electrodes which were not treated and those which were treated in accordance with this invention. As is evident from the curves, the reduction in polarization is greatest at the higher current densities.

Other tests using substrates containing a carbon known commercially as Conductex SC (200 $m^2/g$ surface area) have confirmed the results of the original tests. These electrodes showed an improvement of 0.015V at 100 $ma/cm^2$ and 0.04V at 500 $ma/cm^2$. Still further tests using a carbon known commercially as XC 3001 (surface area 76 $m^2/g$) confirmed the results of the original tests. These electrodes showed an improvement of 0.063V at 200 $ma/cm^2$. In all cases polarization decreased, though in varying degrees depending on the particular substrate. In this regard, it was noted that polarization reduction is much greater in electrodes prepared from carbons having surface areas of 100 $m^2/g$ or lower — possibly due to the tighter structure which results when these carbon blacks are used. In most cases observed, a decrease in cathode polarization of at least about 0.05V occurs at 100 $ma/cm^2$. In complete operating cells, cathodes which have been treated in accordance with this invention have successfully run from 2,000 to 4,000 hours indicating no detrimental affects in terms of cathode life as a result of this treatment.

Anodes have been fabricated in much the same manner as set forth above but with different catalysts (e.g., 0.50 – 2.0 $mg/cm^2$ of rhodium). These electrodes show no decrease in polarization, as such, but there is a spectacular increase in their usable length of service before anodic polarization increases to an unacceptable level due to slow poisoning of the catalyst. In this regard, the operating life of rhodium catalyzed anodes at 100 $ma/cm^2$ increased from an average from 100 to 200 hours to an average of 2,000 to 4,000 hours after treatment in accordance with this invention.

The alkaline earth metal carboxylates usable with the preferred form of this invention are those which are soluble at least to the extent of about 100 grams per liter in alcohol or alcohol-water mixtures. They should not be derived from long-chain fatty acids (i.e., over 8 carbon atoms) so that they do not have soap-like properties. Otherwise, the carboxylate anion may be derived from any of the mono-, di-, tri- and/or hydroxy-acids which form alcohol-soluble, non-soap-like salts with the alkaline earth metals. Typical of the preferred monoacidic acids are formic, acetic, propionic, butyric, and valeric. Among the dibasic acids are oxalic, malonic, succinic, glutaric, adipic, and pimelic. Most notable of the hydroxy triacidic acids usable with this invention is citric acid.

The solvents used to introduce the carboxylate into the electrode must be ones which will dissolve sufficient quantities of the carboxylate and which will produce a solution having a surface tension capable of penetrating the otherwise hydrophobic electrode. The low molecular weight aliphatic alcohols (i.e., methanol-pentanol) are acceptable for this purpose, with isopropanol being preferred.

The electrocatalytic material usable with this invention may be any of those commonly known in the art. They should have a surface area of at least 10 $m^2/g$ and preferably considerably more up to about 500 $m^2/g$. Surface areas greater than 500 $m^2/g$ are usable but provide no significant advantages over those which are less than about 500 $m^2/g$. Carbon, acetylene blacks, activated carbon and noble metal blacks such as platinum, palladium, rhodium and iridium, etc. are all usable with this invention. Silver and gold, if of sufficiently fine structure and high surface area, are also acceptable. Other suitable electrocatalyst materials include such electronically conducting doped oxides as lithiated nickel oxide as well as a number of metal carbides and borides. Platinum, rhodium and iridium are used primarily for hydrogen anodes while rhodium, platinum, palladium and alloys thereof with osmium or ruthenium are preferred for cathodes. These catalysts may be used either as metal blacks or carried on what is otherwise a noncatalytic high surface area substrate such as carbon particles. Anodes made from carbon blacks can be catalyzed with the platinum group metals as well as nickel or nickel boride. For cathodes, peroxide decomposing substances are required and hence platinum, palladium, osmium, ruthenium, manganese oxide, silver and a number of transition metal oxides are usable.

Alkaline earth metal carboxylate solutions useful with this invention preferably contain at least about 100 grams per liter of carboxylate in order to effectively and simply treat electrodes without needlessly repeating steps. Much more dilute solutions could be used, but several repeated applications and drying cycles would be required to build up an effective concentration of the oxide/hydroxide in the electrode structure. On the other hand, alkaline earth metal carboxylate solutions in excess of about 300 grams per liter are so thick and so viscous as to inhibit effective penetration into the electrode body when brushing, dipping, etc. is used.

While this invention has been discussed primarily in terms of a few embodiments thereof it is not intended to be limited thereto but rather only to the extent hereinafter set forth in the claims which follow.

I claim:

1. A method for increasing the effective internal reactive surface area of porous, alkaline electrolyte, hydrophobic-type gas electrodes which comprise a conductive support and at least one layer of a sintered admixture of hydrophobic polymer particles and electrocatalytic particles, said method comprising the steps of: infiltrating said layer with an alcoholic solution of an alcohol-soluble, non-soap-forming, alkaline earth metal carboxylate; drying said electrode to remove the solvent from said solution and deposit said carboxylate within the interstices of said layer; and converting said alkaline earth metal carboxylate to its corresponding alkaline earth metal oxide to provide a plurality of electrolyte wettable paths extending throughout said layer.

2. A method for increasing the effective internal reactive surface area of porous, alkaline electrolyte, hydrophobic-type gas electrodes which have a gas-exposed face, an electrolyte-exposed face and which comprise a conductive support and at least one layer of a sintered admixture of hydrophobic polymer particles and electrocatalytic particles, said method comprising the steps of: infiltrating said layer and coating said electrolyte-exposed face with an alcoholic solution comprising at least about 100 grams per liter of an alcohol-soluble, non-soap-forming, alkaline earth metal carboxylate; drying said electrode to remove the solvent from said solution and deposit said carboxylate within the interstices of said layer and on the electrolyte-exposed face of said electrode; and heating said alkaline earth metal carboxylate to decompose it into its corresponding alkaline earth metal oxide to provide an electrolyte wettable surface on said electrolyte-exposed face and a plurality of electrolyte wettable paths extending therefrom into the interstices of said layer.

3. A method for increasing the effective internal reactive surface area of porous, alkaline electrolyte, hydrophobic-type gas electrodes which have a gas-exposed face, an electrolyte-exposed face and which comprise a conductive support and at least one layer of a sintered admixture of hydrophobic polymer particles and electrocatalytic particles, said method comprising the steps of: infiltrating said layer and coating said electrolyte-exposed face with an alcoholic solution comprising at least about 100 grams per liter of at least one alkaline earth metal salt selected from the group consisting of the magnesium and calcium formates, acetates and citrates; drying said electrode to remove the solvent and deposit particles of said salt within the interstices of said layer and on the electrolyte-exposed face of said electrode; and heating said salt particles to decompose them into their corresponding oxides to provide an electrolyte wettable surface on said electrolyte-exposed face and a plurality of electrolyte wettable paths extending therefrom into the interstices of said layer.

4. A method for increasing the effective internal reactive surface area of porous alkaline electrolyte, hydrophobic-type gas electrodes which have a gas-exposed face, an electrolyte-exposed face, and which comprise at least one layer of a sintered admixture of hydrophobic polymer particles and electrocatalytic particles, said method comprising the steps of: infiltrating said layer and coating said electrolyte-exposed face with a solution comprising about 100 to about 300 grams per liter of magnesium acetate in an isopropyl alcohol containing solvent; drying said electrode to remove said solvent and deposit said magnesium acetate within the interstices of said layer and on the electrolyte-exposed face of said electrode; and heating said electrode to a temperature of at least about 320° C. for a time sufficient to decompose said magnesium acetate to magnesium oxide to provide an electrolyte wettable surface on said electrolyte-exposed face of said electrode and a plurality of electrolyte wettable paths extending into the interstices of said layer.

5. A method for increasing the effective internal reactive surface area of porous, alkaline electrolyte, hydrophobic-type gas electrodes which comprise a conductive support and at least one layer of a sintered admixture of hydrophobic polymer particles and electrocatalytic particles, said method comprising the steps of: infiltrating said layer with an alcoholic solution of an alcohol-soluble, non-soap-forming, alkaline earth metal carboxylate; drying said electrode to remove the solvent from said solution and deposit said carboxylate within the interstices of said layer; and converting said alkaline earth metal carboxylate to its corresponding alkaline earth metal hydroxide to provide a plurality of electrolyte wettable paths extending throughout said layer.

6. A method for increasing the effective internal reactive surface area of porous, alkaline electrolyte, hydrophobic-type gas electrodes which have a gas-exposed face, an electrolyte-exposed face and which comprise a conductive support and at least one layer of a sintered admixture of hydrophobic polymer particles and electrocatalytic particles, said method comprising the steps of: infiltrating said layer and coating said electrolyte-exposed face with an alcoholic solution comprising at least about 100 grams per liter of an alcohol-soluble, non-soap-forming, alkaline earth metal carboxylate; drying said electrode to remove the solvent from said solution and deposit said carboxylate within the interstices of said layer and on the electrolyte-exposed face of said electrode; and immersing said electrode into a solution of an alkali metal hydroxide to convert said alkaline earth metal carboxylate to its corresponding alkaline earth metal hydroxide to provide an electrolyte wettable surface on said electrolyte-exposed face and a plurality of electrolyte wettable paths extending therefrom into the interstices of said layer.

7. A method for increasing the effective internal reactive surface area of porous, alkaline electrolyte, hydrophobic-type gas electrodes which have a gas-exposed face, an electrolyte-exposed face and which comprise a conductive support and at least one layer of a sintered admixture of hydrophobic polymer particles and electrocatalytic particles, said method comprising the steps of: infiltrating said layer and coating said electrolyte-exposed face with an alcoholic solution comprising at least about 100 grams per liter of at least one alkaline earth metal salt selected from the group consisting of the magnesium and calcium formates, acetates and citrates; drying said electrode to remove the solvent and deposit particles of said salt within the interstices of said layer and on the electrolyte-exposed face of said electrode; and immersing said electrode into a solution of an alkali metal hydroxide to convert said salt particles to their corresponding hydroxides to provide an electrolyte wettable surface on said electrolyte-exposed face and a plurality of electrolyte wettable paths extending therefrom into the interstices of said layer.

8. A method for increasing the effective internal reactive surface area of porous alkaline electrolyte, hydrophobic-type gas electrodes which have a gas-exposed face, an electrolyte-exposed face, and which comprise at least one layer of a sintered admixture of hydrophobic polymer particles and electrocatalytic particles, said method comprising the steps of: infiltrating said layer and coating said electrolyte-exposed face with a solution comprising about 100 to about 300 grams per liter of magnesium acetate in an isopropyl alcohol containing solvent; drying said electrode to remove said solvent and deposit said magnesium acetate within the interstices of said layer and on the electrolyte-exposed face of said electrode; and immersing said electrode into a solution of an alkali metal hydroxide to convert said magnesium acetate to magnesium hydroxide to provide an electrolyte wettable surface on said electrolyte-exposed face of said electrode and a plurality of electrolyte wettable paths extending into the interstices of said layer.

* * * * *